United States Patent [19]

Sakamoto

[11] 4,276,571

[45] Jun. 30, 1981

[54] SLOW OR STILL MODE VIDEO SIGNAL REPRODUCING APPARATUS WITH INCREMENTED TAPE MOVEMENT

[75] Inventor: Hitoshi Sakamoto, Zama, Japan

[73] Assignee: Sony Corporation, Tokyo, Japan

[21] Appl. No.: 16,022

[22] Filed: Feb. 28, 1979

Related U.S. Application Data

[63] Continuation of Ser. No. 813,237, Jul. 6, 1977, abandoned.

[30] Foreign Application Priority Data

Jul. 13, 1976 [JP] Japan .................................. 51-83119

[51] Int. Cl.³ .......................... H04N 5/78; G11B 15/20
[52] U.S. Cl. ........................................ 360/10; 360/71;
360/74.1; 318/808
[58] Field of Search ....................... 360/10, 14, 33, 70,
360/71, 72.1, 73, 74.1; 318/685, 696, 808

[56] References Cited

U.S. PATENT DOCUMENTS

| 3,519,738 | 7/1970 | Morita | 360/70 |
|---|---|---|---|
| 3,557,320 | 1/1971 | Hopf | 360/10 |
| 3,767,993 | 10/1973 | Yoblonski | 318/696 |
| 3,789,138 | 1/1974 | Terada | 360/10 |
| 3,931,639 | 1/1976 | Arter | 360/73 |
| 3,943,562 | 3/1976 | Opelt | 360/10 |
| 3,968,517 | 7/1976 | Chimura | 360/10 |
| 4,001,882 | 1/1977 | Fiori | 360/14 |
| 4,040,098 | 8/1977 | Beeson | 360/10 |
| 4,101,936 | 7/1978 | Shinhara | 360/10 |

Primary Examiner—Bernard Konick
Assistant Examiner—Alan Faber
Attorney, Agent, or Firm—Lewis H. Eslinger; Alvin Sinderbrand

[57] ABSTRACT

A video signal reproducing apparatus in which a magnetic tape having a video signal recorded thereon in parallel slant tracks is transported by a capstan and pinch roller in cooperation with a capstan drive. The capstan drive is responsive to pulses supplied in the normal mode at a predetermined rate. In a slow motion or still reproduction mode, a pulse generator provides pulse signals to the capstan drive so that the tape can be selectively advanced a predetermined fraction of the pitch of the slant tracks. If any portion of the trace of the head scan contains a noise signal which is observable in the reproduced signal occurring due to the difference in angle of inclination between the scan trace of the head and the recording tracks, the scan trace can be moved relative to the recorded track so that such noise signal coincides with the vertical blanking portion of the video signal, or with any other portion of the video signal where the noise is unobjectable.

8 Claims, 8 Drawing Figures

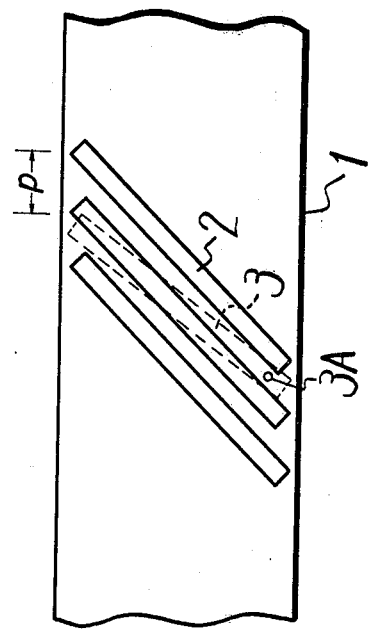
Fig-1A
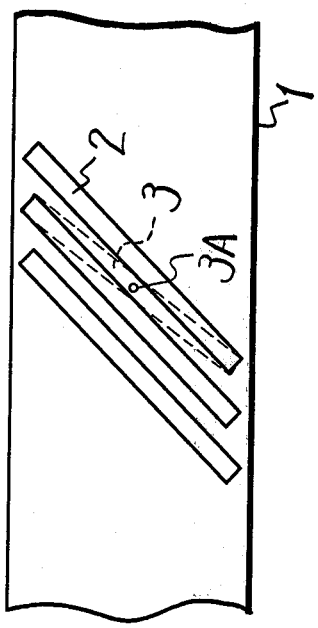
Fig-1B
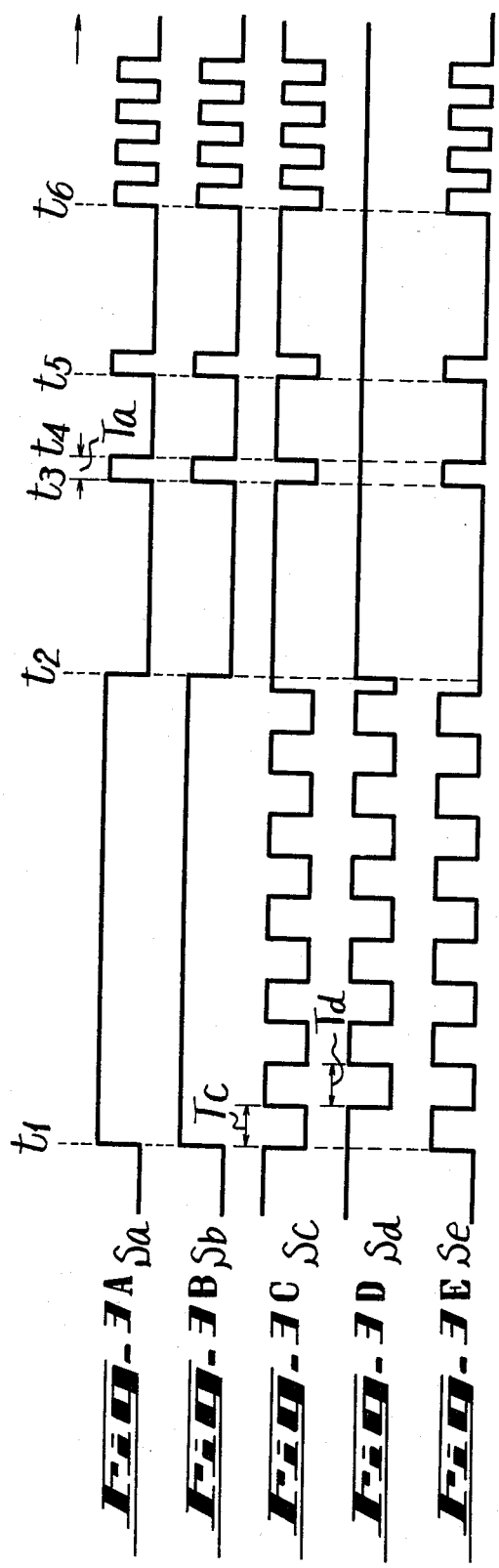

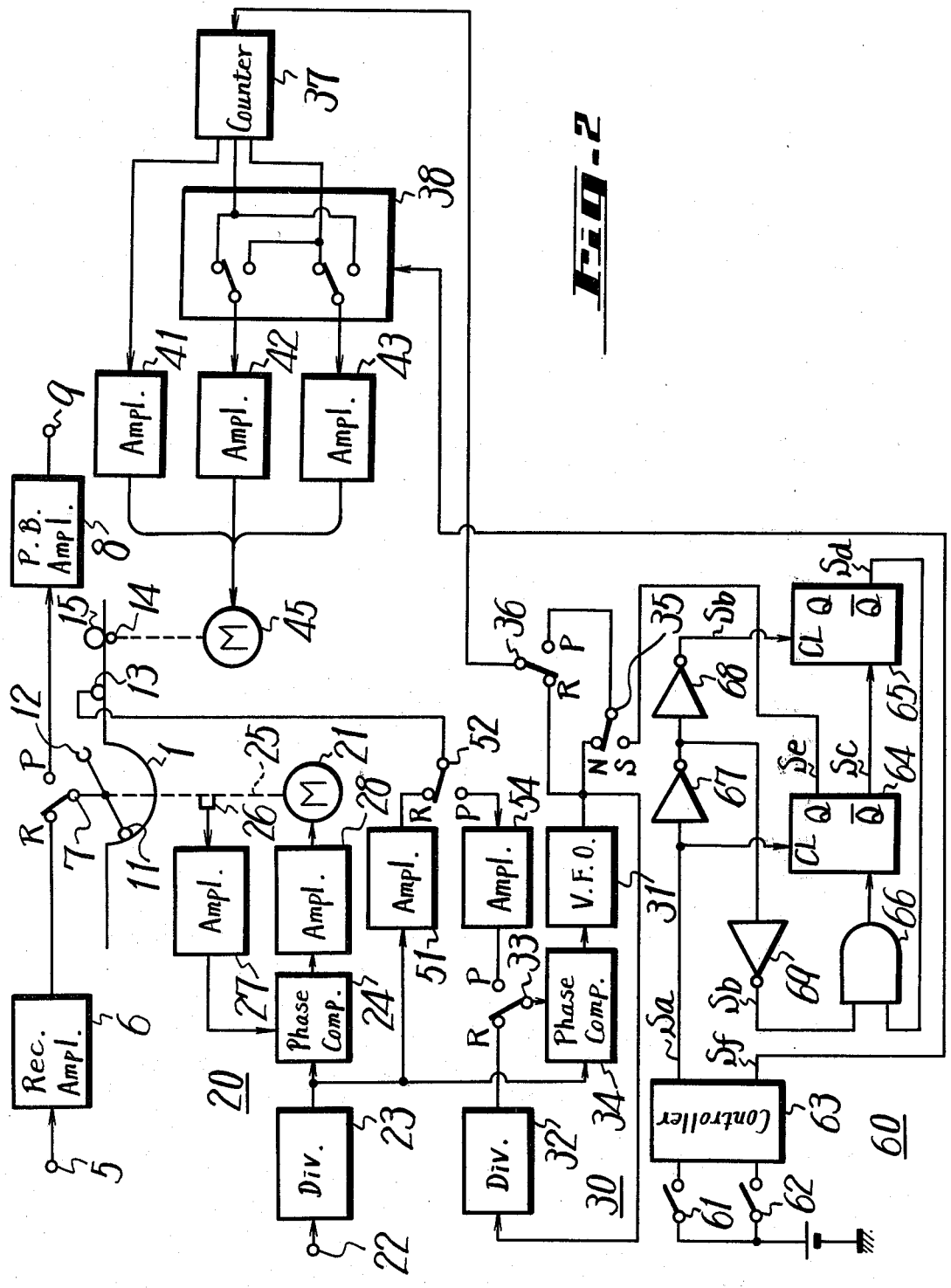

SLOW OR STILL MODE VIDEO SIGNAL REPRODUCING APPARATUS WITH INCREMENTED TAPE MOVEMENT

This is a continuation, of application Ser. No. 813,237, filed July 6, 1977, now abandoned.

BACKGROUND OF THE INVENTION

1. Field of the Invention

The present invention relates generally to a video signal reproducing apparatus, and is directed more particularly to a video signal reproducing apparatus with which a slow motion reproduction or still reproduction mode can be achieved suitably.

2. Description of the Prior Art

In prior art magnetic video signal reproducing apparatus (which will be hereinafter referred simply to as a VTR) of the helical scanning type, if a magnetic tape is transported at a low speed or stopped under a magnetic head being rotated at the frame frequency, a slow motion reproduction or still reproduction mode can be achieved.

Thus, in the case where a video tape is edited, if the tape is transported in a step manner with respect to each video track, a reproduced picture is created for each field wherein a desired editing point can be found or searched.

However, with the prior art, since the inclination angle in the still reproducing mode of the parallel slant video tracks on the video tape is different from the scanning traces on the tape by the magnetic head, the head scans a portion of the tape between adjacent video tracks (a so-called guard band). Thus, during still reproduction, the head partially scans both adjacent video tracks, so that a reproduced video signal contains noise (a so-called guard band noise) with the result that a noise band appears at a mid portion of a reproduced picture.

If a noise band exists at a mid portion of a reproduced picture as mentioned above, upon editing of a video tape, for instance, the reproduced picture is difficult for an editor to watch and it is difficult to check the picture detail, resulting in great annoyance and inconvenience for the editor.

OBJECTS AND SUMMARY OF THE INVENTION

Accordingly, an object of the invention is to provide a video signal reproducing apparatus in which a video tape is transported in a step manner at a pitch corresponding to a predetermined fraction of an arranging pitch of video tracks.

Another object of the invention is to provide a video signal reproducing apparatus in which a noise band appearing during a still reproduction mode can be moved or shifted to the vertical blanking period or to an end portion of a reproduced picture.

A further object of the invention is to provide a video signal reproducing apparatus in which a video tape is transported successively in a step manner at a pitch corresponding to a predetermined fraction of an arranging pitch of video tracks to carry out a slow motion reproduction mode.

A still further object of the invention is to provide a video signal reproducing apparatus with which an editing point can be easily found or searched by operating a switch to determine the editing point accurately.

According to an aspect of this invention, in an apparatus for reproducing a video signal recorded in parallel slant tracks at a predetermined pitch on a recording medium, and which apparatus includes record medium transport means for advancing the record medium in a direction to cause reproducing of signals recorded in successive ones of the slant tracks, and pulse responsive means for controlling the operation of the transport means, there is provided a transport control mechanism comprising control circuit means for selectively providing pulses at the option of a user to the pulse responsive means for advancing the record medium a distance equal to a predetermined fraction of the pitch of the parallel slant tracks in response to each of the pulses.

The above, and other objects, features and advantages of the invention will become apparent from the following description taken in conjunction with the accompanying drawings.

BRIEF DESCRIPTION OF THE DRAWINGS

FIGS. 1A and 1B are top plan schematic views showing a part of a video tape on which slant video tracks are formed, respectively;

FIG. 2 is a systematic block diagram showing an embodiment of a VTR according to the invention; and FIGS. 3A to 3E are waveform diagrams used for explaining the operation of the invention.

DESCRIPTION OF THE PREFERRED EMBODIMENT

In an ordinary VTR of the helical scanning type, if a video tape is transported at a low speed or stopped at the point where the magnetic head is rotating at the frame frequency, a slow motion reproduction or still reproduction mode is achieved. Accordingly, when a video tape is edited on a VTR, if the video tape is transported in a step manner at each video track, a reproduced picture is changed at each field. Thus, that portion of the tape which it is desired to edit (the editing point) can be easily reached.

In the case of slow motion or still reproduction, as shown in FIG. 1A, a video track 2 on a video tape 1 differs from a scanning trace 3 by a magnetic head in inclination angle, so that the heads scan a mid portion 3A (indicated by a circle) in the so-called guard band between adjacent video tracks 2. In such a case, the head scans both of adjacent video tracks 2 simultaneously with the result that a high noise region occurs in the video signal reproduced by the head and hence a noise band appears in a reproduced picture at a portion corresponding to the portion 3A or mid portion of the guard band between adjacent video tracks 2. If a noise band appears at a mid portion of a reproduced picture as set forth above, the content of a reproduced picture can not be checked completely, causing great inconvenience during the editing process.

In order to avoid such a defect, it is necessary that the tape is transported by the length or distance corresponding to a predetermined fraction of an arranging pitch p of video tracks 2 to move or shift the portion 3A where the head bridges the adjacent video tracks to an end portion of video track 2, as shown in FIG. 1B, and accordingly to move the noise band to the vertical blanking period or end portion of a reproduced picture.

An example of the VTR according to the present invention, with which the above operation to move the noise band to the vertical blanking period or to an end portion of the reproduced picture can be easily performed, will be hereinafter described with reference to FIG. 2 which is a systematic block diagram of the VTR according to the invention.

In FIG. 2, 11 and 12 designate rotary magnetic heads which are arranged 180° apart and rotated by a motor 21 at the frame frequency or at the speed of 30 $H_z$, and 20 generally designates a servo circuit. In the servo circuit 20, the vertical synchronizing pulse is fed from an external synchronizing board (not shown) to an input terminal 22. The vertical synchronizing pulse is then fed to a frequency divider circuit 23 to be divided into a signal of 30 $H_z$ which is one-half of the frequency of the vertical synchronizing pulse applied thereto, and the frequency-divided signal is then fed to a phase comparator circuit 24. A pulse generator 26 is provided in cooperation with a rotary shaft 25 of motor 21 to which heads 11 and 12 are attached. The pulse generator 26 produces one pulse at each rotation of heads 11 and 12, and this pulse is fed through a shaping amplifier 27 to the phase comparator 24. The compared output signal therefrom is fed through a driving amplifier 28 to the motor 21 to control the latter. Thus, the rotation of heads 11 and 12 is synchronized with the vertical synchronizing pulse supplied to the terminal 22.

The magnetic tape 1 is obliquely wound on the rotary surface of a drum containing heads 11 and 12 with the angular range of about 180°. In FIG. 2, 14 designates a capstan and 15 a pinch roller.

In the embodiment shown in FIG. 2, there is provided a servo circuit 30, which operates as a phase locked loop (PLL) upon recording to record a video signal on the tape 1 which is transported in accordance with the vertical synchronizing pulse fed to the terminal 22. More particularly, there is provided a variable frequency oscillator (VFO) 31 which produces an oscillation signal whose free-running frequency is, for example, 210 $H_z$. This oscillation signal is supplied to a frequency divider circuit 32 to be frequency-divided by 7 so that the resultant signal has a frequency of 30 $H_z$. This frequency-divided signal is fed through a recording side contact R of a recording and playback mode changing switch 33 to a phase comparator circuit 34 which is also supplied with the output signal from the frequency divider 23. The compared output from the phase comparator 34 is fed to the VFO 31 as its control signal. Thus, the frequency and phase of the oscillation signal from the VFO 31 are synchronized with the vertical synchronizing signal fed to the terminal 22.

The oscillation signal from VFO 31 is fed through a recording side contact R of a recording and playback mode changing switch 36 to a hexadic counter 37 to be converted into three rectangular wave form signals whose frequency is 1/6 of that of the oscillation signal, the phases of which are mutually separated by 120° and which are symmetrical thereby providing a three-phase signal. One of the signals is supplied directly to an amplifier 41 and the others thereof are supplied through a switching circuit 38 to amplifiers 42 and 43, respectively. The output signals from amplifiers 41–43 are fed to a Δ-connection of a three-phase hysteresis motor 45 for driving the capstan 14. Thus, the motor 45 is rotated in synchronism with the vertical synchronizing pulse fed to the terminal 22 and hence tape 1 is transported in synchronism with the synchronizing pulse.

At this time, a video signal is fed from an input terminal 5 through a recording amplifier 6, which includes a frequency modulator and other usual recording components, and through a recording side contact R of a recording and playback mode changing switch 7 to heads 11 and 12, respectively. Thus, the video signal is recorded on the tape 1 such that each field of the video signal forms one slant magnetic track as shown in FIG. 1. At the same time, the frequency-divided signal from the frequency divider 23 is supplied through a recording amplifier 51 and a recording side contact R of a recording and playback mode changing switch 52 to a magnetic head 13 which then records the frequency-divided signal on the tape 1 along its edge portion as a control pulse upon playback.

During ordinary playback, servo circuit 30 acts as a PLL servo circuit to carry out the tracking servo control. In other words, the control pulse is reproduced by the head 13 from the tape 1 and then fed through a playback side contact P of switch 52, a reproducing amplifier 54 and a playback side contact P of switch 33 to the phase comparator 34 which phase-compares the control signal with the frequency-divided signal from the frequency divider 23. The compared output signal from phase comparator 34 is fed to VFO 31 as its control signal and the oscillation signal therefrom is fed through a normal playback side contact N of a playback mode changing switch 35 and a playback side contact P of switch 36 to counter 37. The three phase signals from counter 37 are then supplied through switching circuit 38 and amplifiers 41, 42, 43 to motor 45. As a result, the motor 45 is servo-controlled such that the phase difference between the vertical synchronizing pulse applied to terminal 22 and the control pulse from head 13 is made constant, and hence heads 11 and 12 scan the video tracks 2 on tape 1 correctly.

The video signal reproduced by heads 11 and 12 from tape 1 is delivered through a playback side contact P of switch 7 and through a playback amplifier 8, which includes a limiter, frequency demodulator and so on, to an output terminal 9.

With the embodiment of the invention shown in FIG. 2, the editing point of tape 1 is determined by a control circuit 60. In the control circuit 60, there are provided an operating switch 61 which serves to transport tape 1 at a step corresponding to 1/3.5 of the track pitch p in the forward direction for each time that the switch 61 is operated, an operating switch 62 which serves to transport tape 1 in the reverse direction by the similar manner to that of switch 61, and a control signal generator circuit 63, respectively. This control signal generator 63 produces a control signal Sa, which is "1" when either switch 61 or 62 is in an ON-state as shown in FIG. 3A, and also a signal Sf which is "1" only when switch 62 is made ON. The control circuit 60 further includes monostable multivibrators 64 and 65 for generating pulses each of which is made as a positive-going triggering type and has a clear terminal CL. When the monostable multivibrators 64 and 65 are supplied, at their clear terminals CL, with a signal of "0", their time constant capacitors (not shown) are reset and hence their output terminals Q are made "0" irrespective of mode at that time. An output terminal $\overline{Q}$ of monostable multivibrator 64 is connected to the input terminal of monostable multivibrator 65, while an output terminal $\overline{Q}$ of monostable multivibrator 65 is connected through an AND circuit 66 for gating to the input terminal of monostable multivibrator 64.

In the control circuit 60, there are further provided inverters 67, 68 and 69 which serve to adjust the delay of signals for monostable multivibrators 64 and 65. The signal Sa from control signal generator 63 is fed to clear terminal CL of monostable multivibrator 64, to clear terminal CL of monostable multivibrator 65 through inverters 67 and 68 and further, through inverters 67 and 69 to an input terminal of AND circuit 66.

When both switches 61 and 62 are in an OFF-state, the signal Sa from signal generator 63 is "0" during the time prior to time $t_1$, as shown in FIG. 3A, and the output signal Sb from inverter 68 is also "0" during this same time, as shown in FIG. 3B. Accordingly, the output signal from AND circuit 66 is "0", and monostable multivibrators 64 and 65 are cleared by signals Sa and Sb with the result that their output signals Sc and Sd at their output terminals $\overline{Q}$ are "1", respectively, as shown in FIGS. 3C and 3D.

When a desired editing point is determined, switch 61 or 62 is made ON. Thus, when switch 61 is made ON at time $t_1$ (refer to FIG. 3), signal Sa becomes "1" with the result that monostable multivibrator 64 is released from its clear state. Thereafter, the signal Sb from inverter 68 becomes "1" so that monostable multivibrator 68 is also released from its clear state. In this case, since the signal Sb from inverter 69 becomes "1", the output signal Sd from monostable multivibrator 65 is fed through AND circuit 66 to monostable multivibrator 64 from about time $t_1$. Thus, the monostable multivibrator 64 is triggered by the signal Sd at its positive-going (trailing) edge and also multivibrator 65 is triggered by the signal Sc at its positive-going (trailing) edge. Accordingly, monostable multivibrators 64 and 65 start their oscillation from about time $t_1$ and hence the signals Sc and Sd therefrom are varied at every reversing period Tc and Td, for example 0.2 seconds, of monostable multivibrators 64 and 65 as shown in FIGS. 3C and 3D, respectively.

At this time $t_1$, the monostable multivibrator 64 produces, at its output terminal Q, a signal Se which is reverse in phase from the signal Sc produced at the terminal $\overline{Q}$ of multivibrator 64 as shown in FIG. 3E. This signal Se is supplied through a slow-still playback side contact S of switch 35 and a contact P of switch 36 to counter 37. Accordingly, motor 45 is rotated in response to signal Se, so that tape 1 is transported by motor 45 at a speed corresponding to the frequency of signal Se. In this case, upon recording and normal reproducing or playing back mode, the frequency of the oscillation signal applied from VFO 31 to counter 37 is 210 $H_z$ and, at this time tape 1 is successively transported at a track pitch p so that one field of the video signal forms one magnetic track 2 on tape 1. Therefore, tape 1 is transported for one cycle of the oscillation signal by the distance expressed by $$60p/210 = p/3.5$$

that is, by a fraction of the track pitch p/3.5. In other words, upon the slow and still playback mode of operation, tape 1 is transported in a step manner at a fraction of the track pitch p/3.5. Thus, when switch 61 is made ON, tape 1 is transported in step at a low speed to carry out a still reproduction of pictures.

When the desired picture is reached and is reproduced at, for example, time $t_2$, switch 61 is made OFF. Thus, at time $t_2$, signals Sa and Sb become "0" in level, so that signal Sd is not applied to multivibrator 64 which then stops its oscillation and multivibrators 64 and 65 are cleared by signals Sa and Sb, respectively. As a result, output signals Sc and Sd from multivibrators 64 and 65 become "1" in level from time $t_2$, while signal Se from output terminal Q of multivibrator 64 becomes "0" in level. Thus, the transportation of tape 1 is stopped from time $t_2$ and hence the apparatus is brought into its still reproduction mode.

If any noise band appears on a reproduced picture during the still reproduction mode, switch 61 is momentarily made ON for a period $T_a$ of less than the 0.2 second interval which corresponds to the period $T_c$ required for signal $S_a$ to attain the "1" level ($T_a < T_c$). Time period $T_a$ extends from time $t_3$ to time $t_4$, as shown in FIG. 3A. Then, at time $t_3$ multivibator 64 is triggered and its output signal Sc becomes "0" in level, but signal Sb becomes "0" in level at time $t_4$ where period Ta is terminated. Thus, multivibrator 64 is cleared, and hence its output signal Sc again becomes "1" in level at time $t_4$. Although signal Sc becomes "1" at time $t_4$, at this time multivibrator 65 is cleared by signal Sb with the result that signal Sd remains at the "1" level. Thus, when switch 61 is turned ON only during period Ta ($T_a < T_c$), signal Sc becomes "0" in period Ta and at the same time signal Se becomes "1" in the same period Ta. Accordingly, since one cycle of signal Se is obtained between times $t_3$ and $t_4$, motor 45 is rotated in response to signal Se and hence tape 1 is trasported by the distance of the fraction of track pitch p by p/3.5 with the result that the noise band appearing on the reproduced picture is moved up or down by the distance corresponding to the fraction of track pitch p/3.5.

If the noise band still presents a problem after performing the above operation, switch 61 is made On again at a time $t_5$ later than time $t_4$ and for a period Ta. Thus, tape 1 is again moved by the distance of the predetermined fraction of track pitch p, and the noise band is moved up or down. By repeating the above operation the noise band can be moved successively to a position where it is inconspicuous.

As shown in FIG. 3 after time $t_6$, if the operation of switch 61 between times $t_3$ and $t_4$ is repeated, signal Se will vary at the repetition period of its operation. Thus, the tape 1 can be transported at the speed corresponding to the operating speed of switch 61.

Further, if switch 62 is made ON, signal Se is generated from multivibrator 64 just as in the operation of switch 61. At this time, switching circuit 38 is changed over by signal Sf from signal generator 63 and two of the three three-phase signals supplied from counter 37 to motor 45 are inter-changed, so that the rotation direction of motor 45 is reversed and hence tape 1 is transported in the reverse direction.

As described above, according to the present invention, by operating switches 61 and 62 a desired editing point can be easily searched and hence determined accurately.

With the present invention, if a noise band is moved to a portion of a reproduced picture where the noise band is inconspicuous and thereafter the reversing periods Tc and Td of monostable multivibrators 64 and 65 are made short such that $$6(Tc+Td) < Ta < 7(Tc+Td)$$

by operating switch 61 or 62, tape 1 can be transported in steps of twice the track pitch p, i.e., a slow motion reproduction mode of one frame step can be achieved.

It is also possible that if the apparatus for achieving the above operation of the invention is made as an adaptor for a VTR and assembled thereto, the VTR can be controlled remotely.

The present invention is not limited to the above embodiment and it will be apparent that many modifications and variations could be effected by one skilled in the art without departing from the spirit or scope of the novel concepts of the invention. Therefore, the scope of the invention should be determined by the appended claims.

I claim as my invention:

1. In an apparatus for reproducing a video signal recorded in parallel slant tracks at a predetermined pitch on a recording medium, and which apparatus includes record medium transport means for advancing the record medium in a direction to cause reproducing of signals recorded in successive ones of said slant tracks, and pulse responsive means for controlling the operation of said transport means: a transport control mechanism comprising control circuit means for selectively providing pulses at the option of a user to said pulse responsive means for advancing said record medium a distance equal to a predetermined fraction of said pitch of said parallel slant tracks in response to each said pulse.

2. The apparatus according to claim 1, wherein said control circuit means includes a control signal generator having a first output terminal, actuating means connected with said control signal generator and capable of being selectively set into an "on" state, said control signal generator providing from said first output terminal a first signal whenever said actuating means is set into said "on" state, and pulse forming means for providing said pulses to said pulse responsive means in response to said first signal.

3. The apparatus according to claim 2, wherein said pulse forming means includes first and second monostable multivibrators each having an input terminal, a clear terminal, an output terminal, and an inverse output terminal; a logic circuit; and circuit means for adjusting the delay time of said first and second multivibrators and being connected with the first terminal of said control signal generator for providing said first signal to the clear terminal of said first multivibrator, to the clear terminal of the second multivibrator and to said logic circuit, the inverse output terminal of said second multivibrator being connected with said logic circuit, said logic circuit providing a signal to the input terminal of said first multivibrator whenever there is coincidence between said first signal and the output from said inverse output terminal of said second multivibrator, the inverse output terminal of said first multivibrator being connected to the input terminal of said second multivibrator, and the output terminal of said first multivibrator providing pulses to said pulse responsive means.

4. The apparatus according to claim 1, wherein said record medium transport means includes an electric motor and an associated supply means for providing current to said motor, and said pulse responsive means includes a digital counter and means responsive to the latter for controlling the operating characteristics of said current.

5. The apparatus according to claim 4, wherein said motor is a multiple-phase motor, and said supply means includes a plurality of amplifiers, each of said amplifiers providing a current to said motor, and said means responsive to the counter controls each of said amplifiers so that the amplitude of each said current is determined by the count on said counter.

6. The apparatus according to claim 4, wherein said motor is a three-phase motor, and said supply means includes three amplifiers, each said amplifier providing to said motor a current whose amplitude is determined in response to the count on said counter and which is separated in phase by 120° from the currents provided by the other two amplifiers.

7. The apparatus according to claim 6, wherein said control circuit means includes a control signal generator and a reverse actuating means connected with said control signal generator and capable of being selectively set into an "on" state, said control signal generator providing a reversing signal when said reverse actuating means is set into said "on" state thereof, and said supply means further includes switching means connected with two of said amplifiers, and interchanging the currents of said two amplifiers in response to the reversing signal from said control signal generator, thereby reversing the direction of rotation of said motor in response to said reversing signal.

8. In an apparatus for reproducing a video signal recorded in parallel slant tracks at a predetermined pitch on a recording medium, and which apparatus includes record medium transport means for advancing the record medium in a direction to cause reproducing of signals recorded in successive ones of said slant tracks, and pulse responsive means for controlling the operation of said transport means: a transport control mechanism for providing accurate reproduction of said video signal during slow and stop motion of said recording medium, comprising control circuit means for selectively providing pulses at the option of a user to said pulse responsive means for advancing said record medium a distance equal to a predetemined fraction of said pitch of said parallel slant tracks in response to each said pulse, said selective operation of said control circuit means occurring only during said slow and stop motions of said recording medium.

* * * * *